United States Patent Office 3,104,269
Patented Sept. 17, 1963

3,104,269
PROCESS FOR PRODUCING ISOPRENE
Gerson S. Schaffel, Old Westbury, N.Y., assignor, by mesne assignments, to Halcon International, Inc., a corporation of Delaware
No Drawing. Filed Dec. 2, 1957, Ser. No. 699,903
9 Claims. (Cl. 260—680)

This invention is concerned with a process for the preparation of isoprene, and more specifically is concerned with the combination of steps of selectively polymerizing propylene to produce 2-methyl-pentene-1, isomerizing said 2-methyl-pentene-1 to 2-methyl-pentene-2, dementhanating said 2-methyl-pentene-2 and recovering isoprene.

It is known in the art how to produce isoprene by "cracking" (i.e., dealkylating, isomerizing, disproportionating, dehydrogenating, etc.) a wide variety of hydrocarbon feed stocks, including, broadly, propylene dimers.

It is a feature of this invention that isoprene can be produced advantageously by selectively polymerizing propylene to produce 2-methyl-pentene-1, isomerizing the 2-methyl-pentene-1 to 2-methyl-pentene-2, and demethanating the 2-methyl-pentene-2. Such a process possesses an advantage over heretofore known processes in that it allows the economical and uncomplicated production of isoprene. For example, the process is simple and straightforward and results in an isoprene product which can be purified without encountering the problems and troubles normally attendant upon purification of isoprene produced by heretofore known processes. Additionally, it is a feature of this invention that expensive and often times extremely difficult fractionations are not encountered.

It is a still further feature of this invention that isoprene can be advantageously prepared by contacting propylene with a catalyst, comprising a trialkyl aluminum and nickel, to produce 2-methyl-pentene-1, passing the polymer produced over a silica-alumina isomerization catalyst in the liquid phase and at a comparatively low temperature and subjecting the effluent from the isomerization step to demethanation. Excellent results are obtained with thermal demethanation. Thus the process of the present invention eliminates the necessity of expensive and complicated fractionations necessary in heretofore known processes, as in each step there is essentially a single product containing a minimal amount of contaminants.

In general, the trialkyl aluminum utilized in the selective polymerization step can be any trialkyl aluminum. However, desirably, the trialkyl aluminum added to the reaction mixture is a tri- (lower-alkyl) aluminum such as, for example, aluminum triisobutyl or aluminum tripropyl. Apparently, in contact with propylene these aluminum trialkyls are converted to a mixture of aluminum tripropyl and aluminum tri-2-methylpentyl. The preparation of such aluminum alkyls is illustrated in the following Example 1. As used in the specification, the term "parts" and "percent" mean parts by weight and percent by weight unless otherwise specified; the term "hourly space velocity" means volumes/volume/hour in which the volumes are measured at standard temperature and pressure.

*Example 1*

180 parts of aluminum triisobutyl and 3 parts nickel acetyl acetonate are charged to a high pressure autoclave equipped with heating means, cooling means and stirring means. There is added 1000 parts liquid propylene. Stirring is commenced and the temperature raised to approximately 250° C. The pressure is that naturally attained and under the conditions described rises to approximately 1800 p.s.i.g. Thereafter, over the course of approximately one hour, the pressure drops to approximately 700 p.s.i.g. The reactor contains a mixture of nickel, the desired aluminum trialkyl in which the alkyl groups are propyl and 2-methyl-pentyl, hydrocarbons which contains some isobutylene as well as some unreacted propylene. The nickel-aluminum alkyl catalyst is recovered.

*Example 2*

100 parts of the nickel-aluminum alkyl prepared in accordance with the procedure of Example 1 is charged to a high pressure autoclave equipped with heating means, cooling means and stirring means. There is added 550 parts liquid propylene. Stirring is commenced and the temperature raised to approximately 250° C. The pressure is that naturally attained and rises to approximately 1800 p.s.i.g. Thereafter, over the course of approximately one hour the pressure drops to approximately 700 p.s.i.g. The reactor contains a mixture of the catalyst which is recovered and used in other runs, unreacted propylene and propylene polymer, 2-methyl-pentene-1. The catalyst, unreacted propylene and propylene polymer are separated. There are obtained 220 parts unreacted propylene and 330 parts 2-methyl-pentene-1.

*Example 3*

Liquid propylene is introduced into a zone maintained at about 250° C. and containing the catalyst prepared as in Example 1. The pressure is maintained at approximately 1000 p.s.i.g. Propylene is introduced at such a rate as to maintain the amount of propylene in the system substantially constant, and there is removed from the system as a gas phase unreacted propylene and 2-methyl-pentene-1. The propylene is separated and returned to the reaction zone. There is obtained as substantially the only product 2-methyl-pentene-1.

*Example 4*

Example 2 is repeated substituting for the nickel acetyl acetonate an equal molar quantity of colloidal platinum. Substantially similar results are obtained.

*Example 5*

Example 3 is repeated substituting for the nickel there used an equal molar quantity of colloidal platinum. Substantially similar results are obtained.

*Example 6*

Example 1 is repeated substituting for the aluminum triisobutyl there utilized equal molar quantities respectively of beryllium triisobutyl, gallium triisobutyl and indium triisobutyl. There are obtained catalysts which, when substituted for the catalyst utilized in Examples 2, 3, 4 and 5, yield as substantially the only polymerization product 2-methyl-pentene-1.

In the foregoing Examples 2 and 4, the molecular ratio of aluminum alkyl to propylene is approximately 1:25 and economical results are obtained. However, it will be realized that the most rapid rate of reaction is obtained when the aluminum alkyl/propylene molecular ratio is in the range of approximately 1:3 to 1:1. In the continuous production of 2-methyl-pentene-1 the molecular ratio of aluminum alkyl to propylene is, of course, dependent upon the rate of introduction of propylene as related to the rate of withdrawal of product and unreacted propylene.

While the foregoing examples illustrate operating at a temperature of approximately 250° C., it will be realized broadly that the polymerization can be carried out at a temperature in the range of from approximately 50° to 280° C., and desirable results are obtained operating in the temperature range of 180° to 250° C.

In the foregoing examples, the pressure is maintained at above the critical pressure of propylene and varies, of course, with the temperature at which the operation is carried out. It is to be realized that the particular catalysts utilized in the foregoing examples are susceptible to oxygen-containing compounds and are adversely affected thereby. Thus, such materials as oxygen, water, alcohols and the like are to be excluded from the reaction zone. Conveniently, the foregoing examples are carried out in stainless steel equipment; however, any inert wall boundaries capable of withstanding the pressures generated are satisfactory.

The isomerization step of the present invention comprises selective isomerization of 2-methyl-pentene-1 to 2-methyl-pentene-2. It is a feature of the present invention that this isomerization can be accomplished at lower temperatures and in the liquid phase as compared to heretofore known processes. The isomerization is illustrated by the following Examples 7 to 10.

*Example 7*

In a container equipped with a reflux condenser equal parts by volume of 2-methyl-pentene-1 and "Houdry silica-alumina S–16" catalyst dried by passing dry nitrogen over the catalyst at a temperature of approximately 60° C. until the outlet gases are dry and contain no moisture, are contacted at 60° C. for approximately 60 minutes. There is obtained an equilibrium mixture of approximately 85 parts 2-methyl-pentene-2 and 15 parts 2-methyl-pentene-1. This mixture is suitable for use as feed to the demethanation step and yields an isoprene product containing minimal amounts of contaminants.

*Example 8*

Example 7 is repeated utilizing a contact time of 20 minutes and substituting for the "Houdry silica-alumina S–16" catalyst there utilized a similar quantity of "Houdry silica-alumina S–90" catalyst which has been treated with sodium carbonate solution, thoroughly washed with water and then treated with buffered acetic acid having a pH of 4.6 and dried as described for the "S–16" catalyst but at a temperature of approximately 100° C. Substantially similar results are obtained. Similarly, utilization of "S–90" catalyst which has been base-treated as above, washed and treated with buffered acetic acid solutions having a pH in the range of from about 3 to 5 yields substantially equilibrium mixtures of 2-methyl-pentene-2 and 2-methyl-pentene-1 when substituted for the catalyst according to the foregoing procedure.

*Example 9*

Example 7 is repeated substituting for the "Houdry silica-alumina S–16" catalyst there utilized an equal quantity of "Houdry silica-alumina M–46" catalyst. Substantially similar results are obtained.

*Example 10*

Example 7 is repeated utilizing a contact time of approximately 2 hours and substituting for the "Houdry silica-alumina S–16" catalyst there utilized an equal quantity of Dowex–50 ion exchange resin (sulfonated styrene-divinyl benzene polymer) in acid form which has been dried by heating at approximately 110–115° C. for 12–18 hours. Substantially similar results are obtained.

The immediately foregoing examples illustrate the catalytic isomerization of 2-methyl-pentene-1 to 2-methyl-pentene-2 in the absence of polymerization utilizing as a catalyst, for example, base-modified synthetic zeolites. This isomerization is carried out continuously by passing 2-methyl-pentene-1 over a catalyst bed at an hourly space velocity of 3 at a temperature of about 60° C. and at substantially atmospheric pressure to yield an equilibrium mixture of 2-methyl-pentene-2 and 2-methyl-pentene-1, as described above. The space velocity can be in the broad range of 1 to 10 and desirably is in the range of about 2 to about 4. The temperature of the 2-methyl-pentene-1 entering the catalyst bed is in the broad range of from about 35° C. to the boiling point of the organic phase at the particular pressure utilized. Desirable results are obtained in the temperature range of from about 45 to about 70° C. utilizing, as necessary, moderate pressures on the system.

The "demethanation" step of the process is carried out by passing the 2-methyl-pentene-2, obtained as described above, preferably pure but allowably containing approximately equilibrium quantities of 2-methyl-pentene-1 through a zone heated to a temperature in the range of from about 700 to about 850° C. at an hourly space velocity in the broad range of from about 1000 to about 1,000,000.

While, as afore-described, good results are obtained operating in the broad temperature range of from about 700 to 850° C., excellent results are obtained operating in the temperature range of about 750 to 825° C., and it is preferred to operate at a temperature of about 800° C.

Inert diluent such as nitrogen, helium, mixtures of carbon-monoxide and carbon-dioxide can be used as diluents for the 2-methyl-pentene-2 hydrocarbon feed. Preferably steam is utilized as a diluent. When diluents are used the 2-methyl-pentene-1/diluent volume ratio can be in the broad range of from about 1:0.4 to about 1:15.

Desirable results are obtained utilizing a reaction zone bounded by nickel-free stainless steels, and it is possible to utilize nickel-containing stainless steels, for example 310 stainless steel, provided the boundary surfaces are first inactivated by, for example, sulfiding, by treating at elevated temperatures with an appropriate sulfur-containing compound such as, for example, hydrogen sulfide or methyl mercaptan, i.e., a stream of the sulfur-containing compound is passed through the tube heated to an elevated temperature, for example, 500° C., for a period of approximately one half hour or longer.

The below indicated hydrocarbon streams with or without steam diluent in the amounts indicated are passed at an hourly space velocity of 16,000 respectively through an unpacked one quarter inch diameter 310 stainless steel tube (which has been sulfided as described above) and through a similar tube packed with silicon carbide particles in which the wall temperatures are maintained at 800° C. Isoprene is produced, and there are obtained the conversions and selectivities indicated in Table I below. As used herein, percent conversion means mols of hydrocarbon consumed per 100 mols of hydrocarbon feed, and percent selectivity means mols of isoprene produced per 100 mols of hydrocarbon consumed.

TABLE I

| Example | Hydrocarbon Stream | Diluent | Hydrocarbon/Diluent Ratio | Unpacked Tube | | Packed Tube | |
|---|---|---|---|---|---|---|---|
| | | | | Percent Conversion | Percent Selectivity | Percent Conversion | Percent Selectivity |
| 11 | 2-methyl-pentene-2 | | | 63 | 32 | 60.1 | 35 |
| 12 | Product of Example 8 | | | 65 | 30 | 62 | 32 |
| 13 | 2-methyl-pentene-2 | Steam | 1:6 | 34.5 | 47.4 | 63.5 | 41.2 |
| 14 | Product of Example 8 | do | 1:6 | 35 | 44 | 65 | 39 |
| 15 | 2-methyl-pentene-1 | | | 60 | 16 | 57 | 18 |
| 16 | do | Steam | 1:6 | 36 | 23 | 49.2 | 16.8 |

Repetition of Examples 1–16, substituting for the 310 stainless steel tube there utilized an aluminum bronze tube (having an analysis of 5% aluminum, 95% copper and 0.035% arsenic) and a diameter of one quarter inch yields similar results.

The foregoing examples illustrate various embodiments of the individual steps of the process of the present invention. The following Examples 17 and 18 are embodiments of the present invention illustrating the combination of these individual steps.

*Example 17*

500 parts per hour of fresh liquid propylene, plus a recycled gas stream containing 300 parts per hour of propylene and 260 parts of 2-methyl-pentene-1, as described below, is charged continuously to a vessel which is maintained at 240° C. and at a pressure of approximately 700 p.s.i.g. and which contains in liquid phase 300 parts of the nickel-aluminum alkyl catalyst of Example 1, and 2000 parts of hydrocarbon compounds consisting mainly of propylene and 2-methyl-pentene-1. Gases emerging from the vessel are cooled to 230° C. and the condensate resulting therefrom is returned to the vessel. The remaining uncondensed gases contain 330 parts per hour of unreacted propylene and 730 parts per hour of 2-methyl-pentene-1, together with only traces of other products. These gases are further cooled in a separate cooling zone to 150° C., where the pressure is maintained at 200 p.s.i.g. The condensate and residual gases are separated. The residual gases consist mainly of 300 parts per hour of propylene and 260 parts per hour of 2-methyl-pentene-1. These gases are recycled to the first step of the process as recycled gas stream as described above. The condensate contains 30 parts per hour of propylene and 470 parts per hour of 2-methyl-pentene-1. This condensate is further cooled to 60° C. and is then passed through a slender cylindrical vessel containing 160 parts of "Houdry silica-alumina S–90" catalyst prepared as described in Example 8. In this vessel approximately 410 parts per hour of 2-methyl-pentene-1 are converted to 2-methyl-pentene-2. The converted liquid stream is fed to a heater where it is vaporized and heated to 400° C. The vapor, at a pressure only slightly above atmospheric, is passed through the heated zone maintained at 825° C. and of dimensions such that only 0.006 part of hydrocarbon are present within the heated zone. The mixed vapors emerging from the heated zone are promptly quenched to minus 45° C. by being contacted with liquid propylene. Condensate is recovered from the liquid propylene by withdrawing a portion of the solution to a multiplate distillation apparatus, where propylene and lighter hydrocarbons are removed overhead and butene and heavier hydrocarbons are withdrawn as bottoms. The bottoms stream is found to have the following composition:

| | Parts per hour |
|---|---|
| 2-methyl-pentene-2 | 102 |
| 2-methyl-pentene-1 | 15 |
| Isopropene | 102 |
| Methyl-butenes | 8 |
| Isobutene | 11 |
| Other hydrocarbons | 75 |

Isopropene is separated from this bottoms stream by conventional extractive distillation techniques.

*Example 18*

500 parts per hour of fresh liquid propylene, plus a recycled gas stream containing 300 parts per hour of propylene and 260 parts of 2-methyl-pentene-1, as described below, is charged continuously to a vessel which is maintained at 240° C. and at a pressure of approximately 700 p.s.i.g., and which contains in liquid phase 300 parts of the nickel-aluminum alkyl catalyst of Example 1, and 2000 parts of hydrocarbon compounds consisting mainly of propylene and 2-methyl-pentene-1. Gases emerging from the vessel are cooled to 230° C. and the condensate resulting therefrom is returned to the vessel. The remaining uncondensed gases contain 330 parts per hour of unreacted propylene and 730 parts per hour of 2-methyl-pentene-1, together with only traces of other products. These gases are further cooled in a separate cooling zone to 150° C., where the pressure is maintained at 200 p.s.i.g. The condensate and residual gases are separated. The residual gases consist mainly of 300 parts per hour of propylene and 260 parts per hour of 2-methyl-pentene-1. These gases are recycled to the first step of the process as recycled gas stream as described above. The condensate contains 30 parts per hour of propylene and 470 parts per hour of 2-methyl-pentene-1. This condensate is further cooled to 60° C. and is then passed through a slender cylindrical vessel containing 160 parts of "Houdry silica-alumina S–90" catalyst prepared as described in Example 8. In this vessel approximately 410 parts per hour of 2-methyl-pentene-1 are converted to 2-methyl-pentene-2. The converted liquid stream is fed to a heater where it is vaporized and heated to 400° C. The hydrocarbon vapors are then mixed with 300 parts per hour of steam at a temperature of 1000° C. The mixed vapors, at a pressure only slightly above atmospheric, are passed through a heated zone maintained at 800° C. and of dimensions such that only 0.004 part of hydrocarbon are present within the heated zone. The mixed vapors emerging from the heated zone are promptly quenched by bubbling through ice water. Vapors emerging from the ice water quench are further refrigerated to minus 50° C. by surface heat exchange. Surface exchange is difficult to operate for long periods of time, because the presence of water vapor ices up the heat exchange surface, but this difficulty is overcome by use of two or more condensers, with means for switching the flow of gases from one to another. Hydrocarbon condensate is obtained from both the ice water quench and the further refrigeration apparatus. These condensates are collected and have the following total composition:

| | Parts per hour |
|---|---|
| 2-methyl-pentene-2 | 266 |
| 2-methyl-pentene-1 | 39 |
| Isopropreene | 58 |
| Methyl-butenes | 5 |
| Isobutene | 7 |
| Propylene | 45 |
| Other hydrocarbons | 29 |

This condensate is recovered and the isoprene is separated therefrom by conventional extractive distillation techniques. Residual gases consisting of hydrogen, methane, ethylene, ethane, propylene, butylene, small quantities of isoprene, water vapor, and other materials, are compressed and further refrigerated to recover isoprene and the other valuable hydrocarbons.

It will be realized that isoprene is advantageously produced following the procedures of Example 17 or 18 and operating within the various ranges of operating variables previously set forth with respect to the individual process steps. That is, for example, the aluminum alkyl/propylene molecular ratio and temperature for the step of polymerizing can be varied as above described; the temperature can be varied in the range of from about 50° C. to about 180° C. and the pressure also varied. In the isomerization step the various above described catalysts, particularly those utilized in Examples 7, 9 and 10, can be substituted for the catalyst used and similar results obtained. It is to be particularly noted that the above described catalysts make possible the isomerization of olefins particularly alpha olefins such as 2-methyl-pentene-1 in the liquid phase and at temperatures in the range of from about 35° C. to the boiling point of the organic phase at the particular pressure utilized, and that desirable results are obtained in the temperature range of from about 45° C. to 70° C. Thus, it is now possible to isomerize olefins particularly alpha olefins in the liquid phase and at temperatures markedly lower than temperatures heretofore utilized in such isomerizations.

The above discovery is disclosed and claimed in the copending and commonly assigned application of Charles N. Winnick, Serial No. 764,759, filed October 2, 1958 and forms no part of the present invention.

Further, the demethanation step of Examples 17 and 18 can be carried out in the broad range of from about 700° C. to 850° C., desirably 750° C. to 825° C. and preferably 800° C. to produce isoprene. Substitution of an aluminum bronze (as above described) for the stainless steel utilized in Example 17 and 18 gives substantially similar results.

The process of the present invention may be carried out in a batch intermittent or continuous manner.

In view of the foregoing disclosures, variations and modifications thereof will be apparent to one skilled in the art and it is intended to include within the invention all such variations and modifications except as do not come within the scope of the appended claims.

I claim:

1. In a process for the preparation of isoprene, the combination of separate steps of polymerizing propylene to produce 2-methyl-pentene-1, isomerizing said 2-methyl-pentene-1 to 2-methyl-pentene-2, demethanating said 2-methyl-pentene-2 and recovering the isoprene thus formed.

2. In a process for the preparation of isoprene, the combination of separate steps of contacting propylene with a catalyst comprising a trialkyl aluminum and a metal chosen from the group consisting of nickel and platinum to produce 2-methyl-pentene-1, contacting said 2-methyl-pentene-1 in liquid phase with a base-modified synthetic zeolite isomerization catalyst to produce 2-methyl-pentene-2, demethanating said 2-methyl-pentene-2 and recovering the isoprene thus formed.

3. The process of claim 2 in which the catalyst comprises nickel and aluminum trihexyl.

4. In a process for the preparation of isoprene, the combination of separate steps of contacting propylene at a temperature in the range of from approximately 50° C. to 280° C. at superatmospheric pressure with a catalyst comprising aluminum trihexyl and nickel to produce 2-methyl-pentene-1, contacting said 2-methyl-pentene-1 in the liquid phase at a temperature in the range of from about 45° C. to about 70° C. with a base-modified synthetic zeolite isomerization catalyst to produce 2-methyl-pentene-2, passing said 2-methyl-pentene-2 through a zone heated to a temperature in the range of from about 700° C. to about 850° C. at an hourly space velocity in the range of from about 1000 to about 1,000,000, rapidly cooling the effluent from said zone and recovering isoprene from said cooled effluent.

5. In a process for the preparation of isoprene, the combination of separate steps of contacting propylene with a catalyst comprising aluminum trihexyl and nickel at a temperature of approximately 250° C. to produce 2-methyl-pentene-1, contacting said 2-methyl-pentene-1 in the liquid phase at a temperature of 60° C. with a base-modified synthetic zeolite catalyst obtained by contacting a synthetic silica-alumina catalyst with a basic aqueous solution, washing said catalyst free of base, contacting said catalyst with a buffered acidic solution having a pH in the range of 3 to 5 and drying said catalyst by passing dry nitrogen over the catalyst at a temperature of approximately 60° C. until the outlet gases are dry to produce 2-methyl-pentene-2, passing said 2-methyl-pentene-2 through a zone heated to a temperature of about 800° C. at an hourly space velocity in the range of from about 1000 to about 1,000,000, rapidly cooling the effluent from said zone and recovering isoprene from said cooled effluent.

6. A process of claim 5 in which the zone is bounded by nickel-free stainless steel.

7. A process of claim 5 in which the zone is bounded by sulfided 310 stainless steel.

8. A process of claim 5 in which the zone is bounded by an aluminum bronze alloy.

9. In the process of preparing isoprene the combination of separate sequential steps of selectively polymerizing propylene to produce 2-methyl-pentene-1, contacting said 2-methyl-pentene-1 in the liquid phase at a temperature in the range of 45° to 70° C. with an isomerization catalyst to produce an isomerizate containing substantial equilibrium amounts of 2-methyl-pentene-1 and 2-methyl-pentene-2, demethanating said isomerizate and recovering the isoprene thus formed.

References Cited in the file of this patent

UNITED STATES PATENTS

| | | |
|---|---|---|
| 2,396,416 | Frey | Mar. 12, 1946 |
| 2,404,056 | Gorin et al. | July 16, 1946 |
| 2,591,367 | McAllister | Apr. 1, 1952 |
| 2,695,327 | Ziegler et al. | Nov. 23, 1954 |
| 2,735,876 | Hess et al. | Feb. 21, 1956 |
| 2,781,410 | Ziegler et al. | Feb. 2, 1957 |

FOREIGN PATENTS

| | | |
|---|---|---|
| 1,116,132 | France | Jan. 30, 1956 |
| 775,384 | Great Britain | May 22, 1957 |

UNITED STATES PATENT OFFICE
CERTIFICATE OF CORRECTION

Patent No. 3,104,269                      September 17, 1963

Gerson S. Schaffel

It is hereby certified that error appears in the above numbered patent requiring correction and that the said Letters Patent should read as corrected below.

Column 5, line 1, for "1-16" read -- 11-16 --; column 6, line 45, for "Isopropreene" read -- Isoprene --.

Signed and sealed this 7th day of April 1964.

(SEAL)
Attest:

ERNEST W. SWIDER

Attesting Officer

EDWARD J. BRENNER

Commissioner of Patents